(12) United States Patent
Kolekar et al.

(10) Patent No.: US 10,206,083 B2
(45) Date of Patent: Feb. 12, 2019

(54) USING WIRELESS DISPLAY DOCKING TECHNOLOGY OVER INFRASTRUCTURE NETWORKS

(71) Applicant: Intel Corporation, Santa Clara, CA (US)

(72) Inventors: Abhijeet Kolekar, Hillsboro, OR (US); Babu P. Lukose, Portland, OR (US); Preston J. Hunt, Portland, OR (US); Anees A. Sahib, Bangalore (IN); Stephen S. Ing, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,047

(22) Filed: Dec. 30, 2016

(65) Prior Publication Data

US 2018/0192232 A1   Jul. 5, 2018

(51) Int. Cl.
*H04W 4/80* (2018.01)
*H04W 4/70* (2018.01)
*H04L 29/06* (2006.01)
*H04W 84/12* (2009.01)

(52) U.S. Cl.
CPC ............ *H04W 4/80* (2018.02); *H04L 65/608* (2013.01); *H04W 4/70* (2018.02); *H04L 67/42* (2013.01); *H04W 84/12* (2013.01)

(58) Field of Classification Search
CPC ..... H04W 4/008; H04W 4/005; H04W 84/12; H04L 65/608; H04L 67/42
USPC ........................................ 455/41.3
See application file for complete search history.

(56) References Cited

U.S. PATENT DOCUMENTS

| | | | | |
|---|---|---|---|---|
| 5,852,472 A * | 12/1998 | Prasad | ................... | H04N 5/268 348/552 |
| 5,996,008 A * | 11/1999 | Gardos | ................... | H04N 7/147 348/24 |
| 6,633,609 B1 * | 10/2003 | Ing | ....................... | H04N 19/176 375/240.02 |
| 6,665,611 B1 * | 12/2003 | Oran | ..................... | G01S 5/0027 455/404.2 |
| 6,731,325 B1 * | 5/2004 | Qi | ......................... | H04N 7/148 348/14.12 |

(Continued)

FOREIGN PATENT DOCUMENTS

| | | |
|---|---|---|
| KR | 1020140122599 | 10/2014 |
| WO | 2016017908 A1 | 2/2016 |

OTHER PUBLICATIONS

International Search Report and Written Opinion for International Patent Application No. PCT/US2017/063934, dated Mar. 15, 2018, 15 pages.

*Primary Examiner* — Hai V Nguyen
(74) *Attorney, Agent, or Firm* — Jordan IP Law, LLC (57) ABSTRACT

Apparatuses and methods may provide for technology that uses a wireless display docking over an infrastructure network by receiving, via a WiFi link, information associate with an infrastructure discovery of a receiver, using the information to discover the receiver via an infrastructure network i link, forming a connection with the receiver via the infrastructure network link, and streaming content to the receiver via the connection. In addition, receiver technology may emit a beacon signal via a WiFi link, form a connection with a client device via an infrastructure network link, and receive streamed content from the client device via the infrastructure network link.

20 Claims, 8 Drawing Sheets

(56) References Cited

U.S. PATENT DOCUMENTS

| | | | | |
|---|---|---|---|---|
| 6,907,258 B2* | 6/2005 | Tsutsumi | H04L 47/10 | 370/458 |
| 7,925,765 B2* | 4/2011 | Chandra | H04L 61/2015 | 370/237 |
| 7,949,043 B2* | 5/2011 | Ing | H04N 19/176 | 375/240.03 |
| 8,019,346 B2* | 9/2011 | Sachs | H04W 36/0011 | 370/331 |
| 8,756,348 B2* | 6/2014 | Beel | H04M 3/567 | 710/20 |
| 8,923,225 B2* | 12/2014 | Sydor | H04W 72/082 | 370/329 |
| 9,083,769 B2* | 7/2015 | Beel | G06F 3/04842 | |
| 9,176,223 B2* | 11/2015 | Derham | G01S 7/36 | |
| 9,179,321 B2* | 11/2015 | Hasarchi | H04B 7/024 | |
| 9,491,574 B2* | 11/2016 | O'Sullivan | G01S 1/685 | |
| 9,510,391 B2* | 11/2016 | Baum | H04W 84/22 | |
| 9,615,312 B2* | 4/2017 | Lee | H04W 48/10 | |
| 9,722,986 B2* | 8/2017 | Brands | H04L 63/08 | |
| 9,756,450 B1* | 9/2017 | Carrera | H04W 4/001 | |
| 9,860,207 B2* | 1/2018 | Robitaille | H04L 61/2015 | |
| 9,883,390 B2* | 1/2018 | Zhang | H04L 63/08 | |
| 2002/0032746 A1* | 3/2002 | Lazaridis | G06Q 20/20 | 709/217 |
| 2002/0087741 A1* | 7/2002 | Ing | G06F 9/4484 | 719/328 |
| 2003/0186724 A1* | 10/2003 | Tsutsumi | H04L 47/10 | 455/561 |
| 2004/0230695 A1* | 11/2004 | Anschutz | H04L 12/2887 | 709/232 |
| 2005/0078193 A1* | 4/2005 | Ing | H04N 19/176 | 348/222.1 |
| 2006/0050155 A1* | 3/2006 | Ing | G06F 3/005 | 348/231.99 |
| 2006/0104249 A1* | 5/2006 | Karaoguz | H04M 1/2535 | 370/338 |
| 2006/0248252 A1* | 11/2006 | Kharwa | G06F 1/1632 | 710/303 |
| 2007/0239876 A1* | 10/2007 | Chandra | H04L 61/2015 | 709/228 |
| 2008/0183303 A1* | 7/2008 | West | H04L 12/283 | 700/2 |
| 2008/0205345 A1* | 8/2008 | Sachs | H04W 36/0011 | 370/332 |
| 2012/0081557 A1* | 4/2012 | Kupinsky | H04L 12/1407 | 348/207.1 |
| 2012/0257585 A1* | 10/2012 | Sydor | H04W 72/082 | 370/329 |
| 2013/0030918 A1* | 1/2013 | Mourya | G06Q 30/02 | 705/14.58 |
| 2013/0067121 A1* | 3/2013 | Beel | H04M 3/567 | 710/20 |
| 2013/0176161 A1* | 7/2013 | Derham | G01S 7/36 | 342/27 |
| 2013/0210454 A1* | 8/2013 | O'Sullivan | G01S 1/685 | 455/456.1 |
| 2014/0082227 A1* | 3/2014 | Beel | H04L 67/36 | 710/11 |
| 2014/0201400 A1* | 7/2014 | Beel | G06F 3/04842 | 710/63 |
| 2014/0245359 A1* | 8/2014 | De Foy | H04W 36/0011 | 725/62 |
| 2014/0258723 A1* | 9/2014 | Zhang | H04L 63/08 | 713/168 |
| 2014/0351462 A1* | 11/2014 | Beel | H04M 3/567 | 710/63 |
| 2014/0351477 A1 | 11/2014 | Lee et al. | | |
| 2015/0089395 A1* | 3/2015 | Beel | H04L 12/1822 | 715/753 |
| 2015/0109897 A1* | 4/2015 | Lee | H04W 48/10 | 370/216 |
| 2015/0121466 A1* | 4/2015 | Brands | H04L 63/08 | 726/4 |
| 2015/0154126 A2* | 6/2015 | Beel | H04M 3/567 | 710/63 |
| 2015/0169477 A1* | 6/2015 | Beel | H04M 3/567 | 710/10 |
| 2015/0263905 A1* | 9/2015 | Beel | G06F 3/04842 | 715/753 |
| 2015/0302479 A1* | 10/2015 | Cheng | G06Q 30/0261 | 705/14.58 |
| 2016/0088550 A1 | 3/2016 | Rabii et al. | | |
| 2016/0127424 A1* | 5/2016 | Lee | H04W 48/16 | 370/315 |
| 2016/0192419 A1* | 6/2016 | Lee | H04W 48/16 | 370/329 |
| 2016/0316500 A1* | 10/2016 | Aliyar | H04W 76/14 | |
| 2016/0337821 A1 | 11/2016 | Kawakami et al. | | |
| 2016/0345254 A1* | 11/2016 | Iwami | H04W 92/18 | |
| 2017/0006432 A1* | 1/2017 | O'Sullivan | G01S 1/685 | |
| 2017/0026336 A1* | 1/2017 | Robitaille | H04L 61/2015 | |
| 2017/0149833 A1* | 5/2017 | Ngo | H04L 63/20 | |
| 2017/0177511 A1* | 6/2017 | Beel | H04M 3/567 | |
| 2017/0208641 A1* | 7/2017 | Lee | H04W 48/10 | |
| 2017/0272824 A1* | 9/2017 | Bunner | H04N 21/4126 | |
| 2018/0152976 A1* | 5/2018 | Baron | H04W 48/16 | |
| 2018/0183685 A1* | 6/2018 | Cook | H04L 41/20 | |

* cited by examiner

USING WIRELESS DISPLAY DOCKING TECHNOLOGY OVER INFRASTRUCTURE NETWORKS

TECHNICAL FIELD

Embodiments generally relate to wireless display docking technology. More particularly, embodiments relate to efficient discovery and connectivity of devices over infrastructure networks.

BACKGROUND

In enterprise environments, Device-to-Device (D2D) Discovery may be difficult to achieve. Although conventional technologies such as BONJOUR and Universal Plug and Play (UPNP) may be used for service discovery, these technologies are not widely deployed due to limitations. For example, BONJOUR may not work across subnets.

There may be router provisions/updates that facilitate the subnet forwarding of multicast-domain name server (DNS) packets used by BONJOUR. Information technology (IT) providers, however, may not update routers in large scale environments. Indeed, even in small and medium businesses IT upgrades may take place at a very slow pace.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
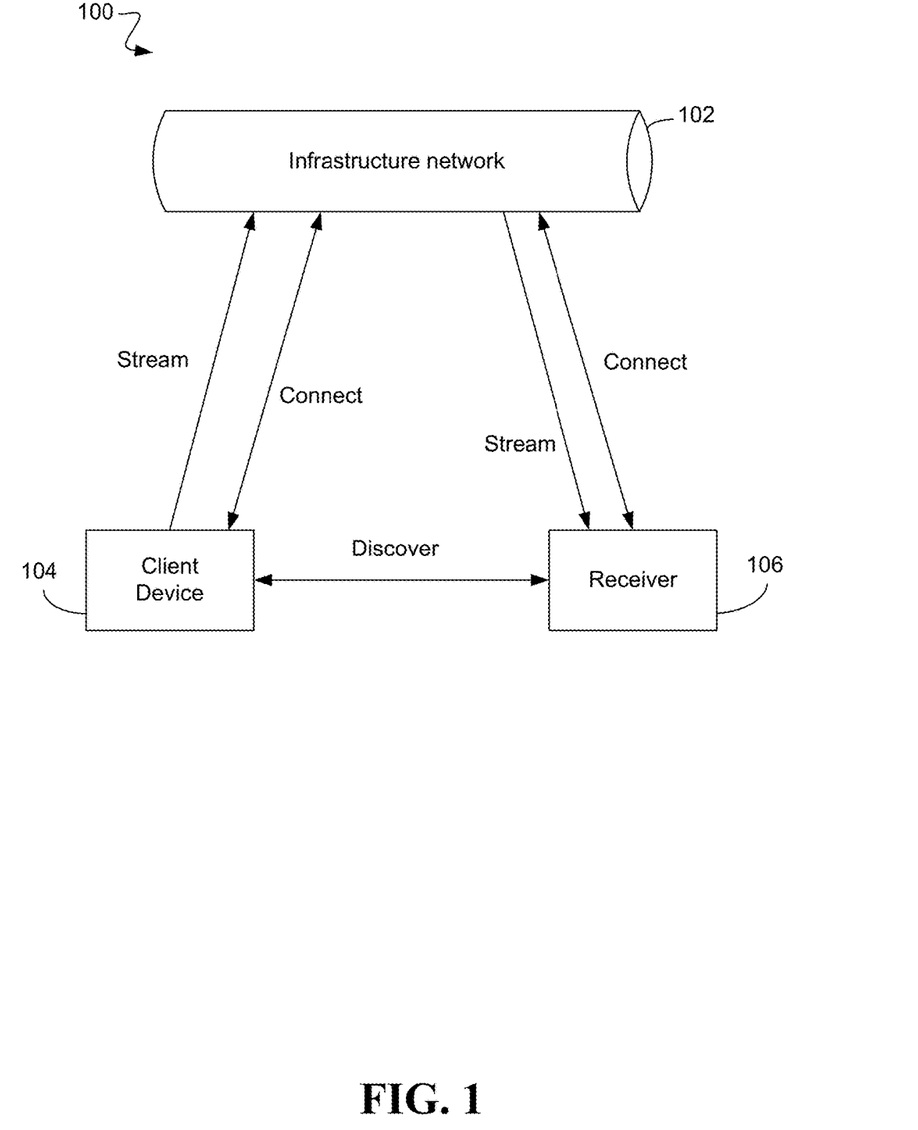
FIG. 1 is an illustration of an example connectivity of a client device to a receiver according to an embodiment.

FIG. 1 illustrates an example architecture 100 in which connectivity of a client device 104 (e.g., notebook computer, tablet computer, convertible tablet, smart phone, personal digital assistant/PDA, mobile Internet device/MID, media player) is provided to a receiver 106 via an infrastructure network 102 (e.g., enterprise wireless local area network/WLAN). In general, the client device 104 may wirelessly stream content to the receiver 106 via the infrastructure network 102, wherein the receiver 106 is connected to a display (not shown) that supports wireless streaming. As will be discussed in greater detail, the client device 104 may discover the receiver 106 via a WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications) link. In one example, the receiver 106 may act as a WiFi access point (e.g., WiFi Direct Autonomous Group Owner/AutoGo) so that the client device 104 may discover the receiver 106 via a WiFi Scan. The client device 104 may also efficiently form a connection with the receiver 106 via the infrastructure network 102, wherein the connection is used to stream the content to the receiver 106.

Figure 2:
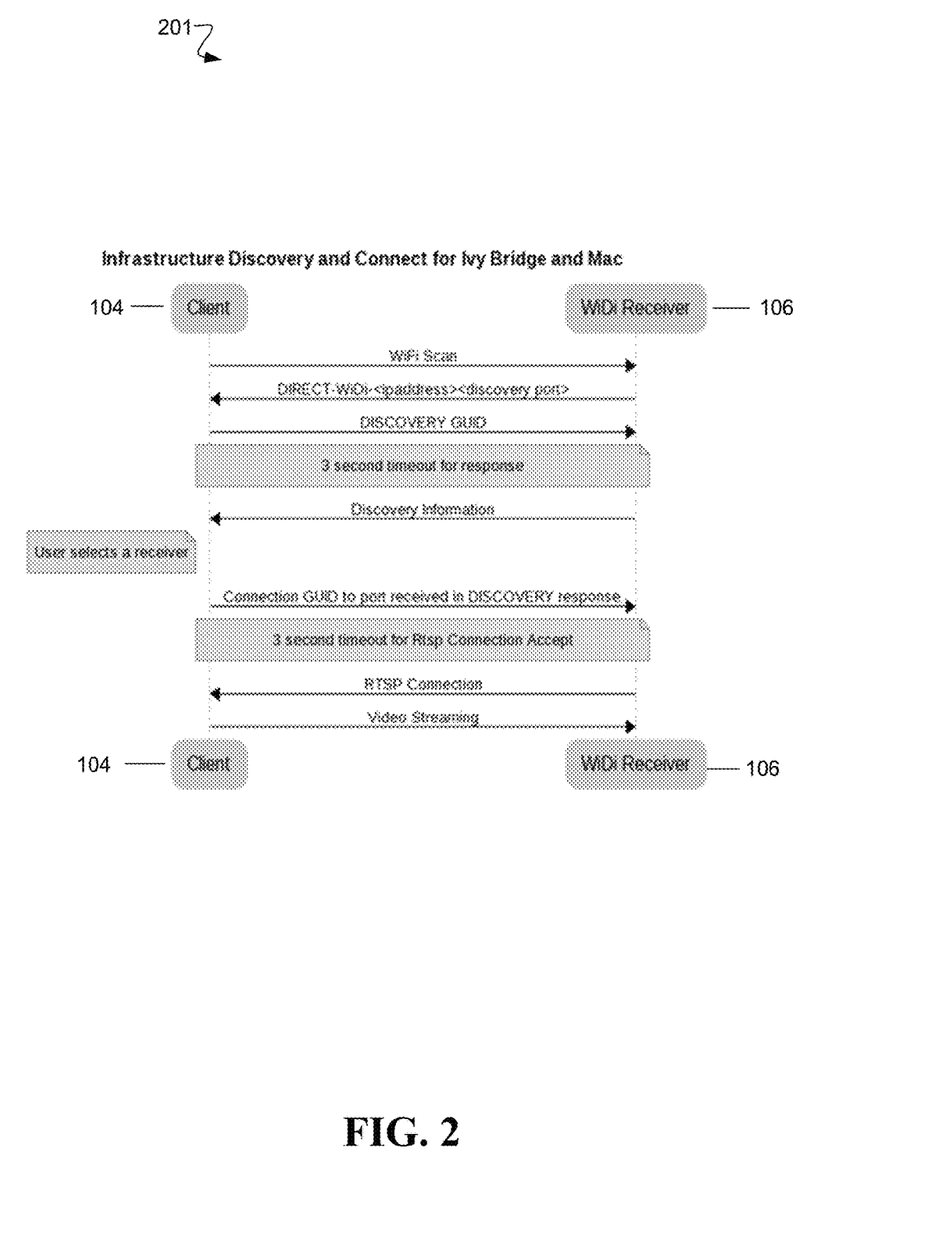
FIG. 2 is an illustration of a more detailed example of a discovery and connect procedure over an Infrastructure network according to an embodiment.

FIG. 2 illustrates in more detail an example of a discovery and connect procedure over an infrastructure network such as, for example, the infrastructure network 102 (FIG. 1). In order to connect to the receiver 106, the client device may listen (e.g., in a WiFi Scan) to a Server Set Identifier (SSID) that the receiver 106 emits, and extract network connection information such as, for example, an Internet Protocol (IP) address, a port number (e.g., Transmission Control Protocol/TCP), etc., from the SSID communication. The client device 104 may then connect to the receiver 106 over the infrastructure network (e.g., enterprise WLAN) and stream video to the display.

For example, INTEL Wireless Display for Enterprise, commonly referred to as INTEL PRO WiDi, may enable a business professional (e.g., a presenter) to share full high definition content to a nearby display via a local wireless connection. Built upon industry standard MIRACAST and enhanced beyond consumer INTEL WiDi, INTEL PRO WiDi includes additional business environment use case scenarios along with enterprise IT attributes of security and manageability.

For example, User 1 and Participant 1 are both connecting via a common network infrastructure (an infrastructure network 102) to the target wireless display receiver. The other client devices may connect via Intel Pro WiDi or Miracast directly to the receiver 106.

After discovery User (Client Device 104) may select the device of his choice and start connection. Upon successful connection setup, a real-time streaming protocol (RTSP) protocol may be used to negotiate capabilities, settings, etc. After successful RTSP negotiations, the connection is established and the client device 104 (e.g., WiDi source) may start streaming the local screen or video content to the display (e.g., WiDi sink).

For WiFi Direct mode, instead of sharing the same wireless band and channel as the wireless infrastructure, the Intel Pro WiDi experience for a business enterprise environment enables the wireless display receiver to be the WiFi-Direct group owner, commonly referred to as Autonomous Group Owner (AGO). In such a case, the receiver 106 may act as a wireless access point in WiFi direct mode.

Wireless display receiver (the receiver 106) is beaconing and sending WiFi probe responses.

Figure 3A:
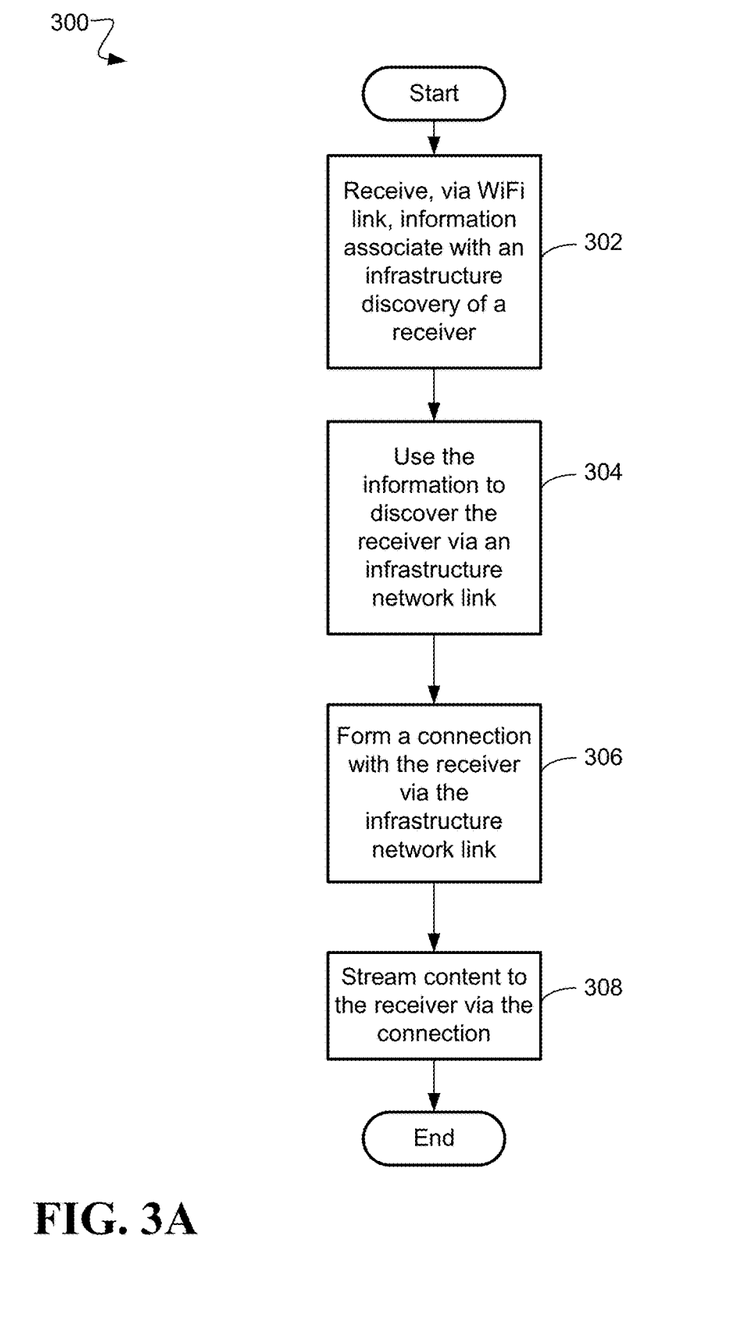
FIG. 3A is a flowchart of an example a method of operating a client device according to an embodiment.

FIG. 3A illustrates a flowchart of an example a method 300 of operating a client device according to an embodiment. The method 300 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in method 300 may be written in any combination of one or more programming languages, including an object-oriented programming language such as C#, JAVA or the like. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In illustrated processing block 302, the client device (e.g., operated by a user interacting with a presenter application) may receive, via WiFi link, information associated with an infrastructure discovery of a receiver. The user may receive the information required for infrastructure discovery of the receiver at layer 2 of the WiFi link. Layer 2 of the WiFi link may include, for example, the encapsulation of upper layer data into frames, the addition of MAC (media access control) information, and so forth. In the illustrated example, layer 2 includes a user performing a wireless network scan to identify target receivers and the target receiver sending to the user a wireless probe response that may include an encoded string that identifies the IP address and port number for connectivity.

More particularly, when the presenter application starts, a wireless network scan may identify target receivers. As part of the SSID in wireless probe response (scan response) from the (WiFi direct network interface) AutoGo, an encoded string may identify the IP address and port number for connectivity.

In illustrated processing block 304, the client device may use the information associated with the infrastructure discovery of the receiver to discover the receiver via an infrastructure network link. Using the IP address and port information obtained, the client device may send a discovery request to the receiver, which then responds with a discovery response.

The discovery sequence from the perspective of the client device is summarized below:

User may scan for available wireless display receivers;

User may select the target receiver from a plurality of wireless display receivers based on a strength of signal emitted by each receiver in the plurality of the receivers.

The WiDi application, using the decoded receiver IP address and port number, sends a connection request to the receiver via the network infrastructure.

In illustrated processing block 306, the client device may form a connection with the receiver via the infrastructure network link. More particularly, after discovery, a connection request may be sent over the infrastructure network using the IP address and port information.

Discovery and connectivity between the client device (e.g., operating an INTEL PRO WiDi presenter application) and receivers generally occurs via the same network infrastructure. The individual components can be connected via wired or wireless network. In addition, the client device is generally in range of the receiver to see the SSID transmitted via regular wireless probe responses.

For example, the SSIDs from INTEL PRO WiDi presenter enabled receivers. The SSID starts with "Direct" followed by sixteen character hexadecimal value and concludes with "WiDi".

Example of wireless SSID seen via a client interface.

The client device may remain wirelessly connected to the infrastructure network and does not connect directly to the receiver.

The discovery and connectivity between the client device and the receiver may be formed at layer 3 of the infrastructure network 102. Layer 3 may generally include, for example, the encapsulation of upper layer information into Internet protocol (IP) packets, the addition of IP headers, and so forth. In the illustrated example, layer 3 includes real-time streaming protocol (RTSP) negotiations between a WiDi receiver and a client.

In illustrated processing block 308, the client device 104 streams content to the receiver 106 via the established connection.

Figure 3B:
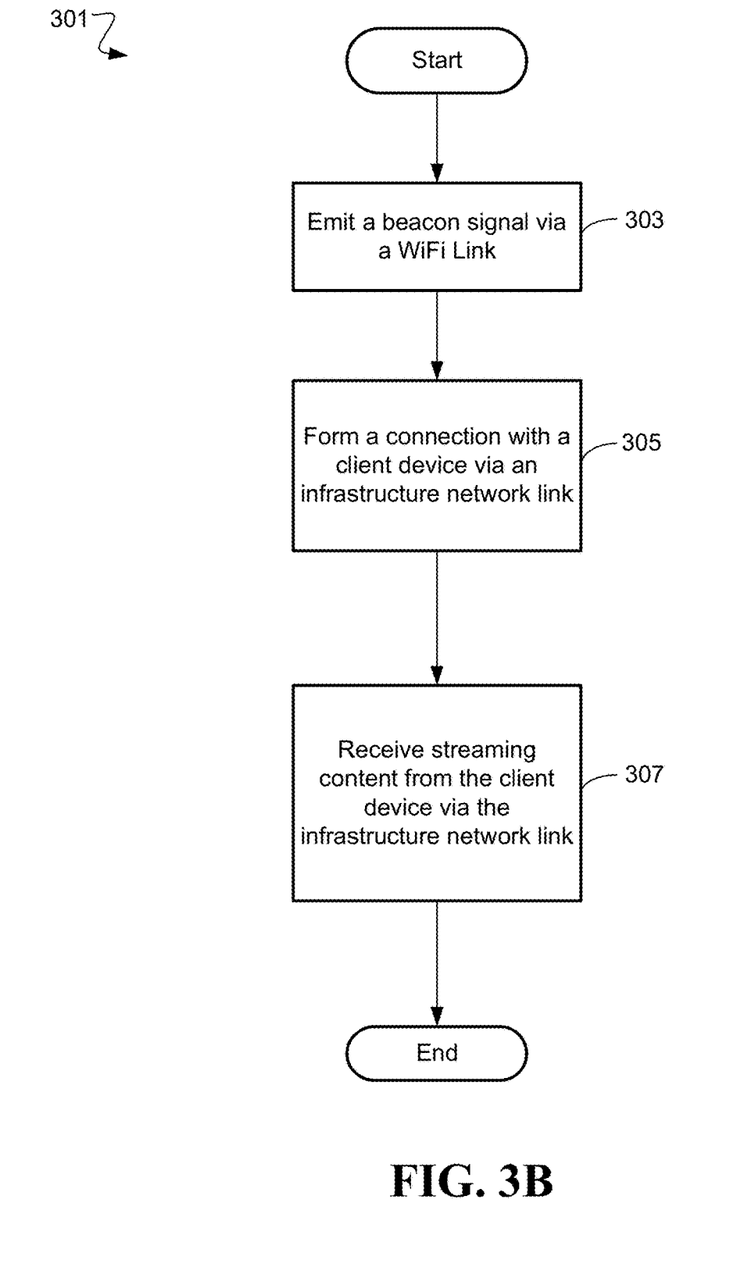
FIG. 3B is a flowchart of an example of a method of operating a receiver according to an embodiment.

FIG. 3B illustrates a flowchart of an example a method 301 of operating a receiver according to an embodiment. The method 301 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

In illustrated processing block 303, the receiver emits a beacon signal via a WiFi link. During a scan, the receiver (e.g., WiDi Sink) may publish a SSID with the following format:

Prefixed with "DIRECT";

Uppercase Hex of IP address, discovery port, & the last 2 bytes of the sink media access control (MAC) address;

Dashes located between prefix and suffix. For example, a WiDi Sink with an IP address of 74.125.43.99, discovery port of 35507, and a MAC address of A0-1D-48-F6-1A-92 might have a SSID of DIRECT-4A7D2B638AB31A92-WIDI.

A receiver may identify an incoming discovery request by the 16 byte Globally Unique ID (GUID)
{0xFF,0xAD,0xF6,0xE1,0xD4,0x3A,0x48,0x16,0x8A, 0xB5,0x4C,0x8A,0xE8,0x5D,0xB4,0x A9}

A WiDi Sink Discovery Response may include the following:

GUID:
{0x6D,0xAE,0x15,0xD7,0x6B,0x6F,0x4D,0xF1,0xBB, 0x64,0xDE,0x53,0x68,0x80,0x87,0x 96}

Length (2 Bytes): number of bytes (in network byte order) following this field that were sent.

Version number of Infrastructure Protocol. 1 Byte with value 0x01.

P2P Device Name/Receiver Name (33 Bytes).

Connection port (2 Bytes).

Mac address of L3 Interface (6 Bytes).

Device Type (1 Byte) of 0x01 for WiDi Infrastructure Sink.

Available for connection (1 Byte).

0x00 Not available for connection.

0x01 Available for connection.

In illustrated processing block 305, the receiver may form a connection with the client device via an infrastructure network link.

The receiver may identify an incoming connection request by the 16 byte GUID.
{0x3a,0xb2,0xab,0x8a,0xff,0x2d,0x44,0xf2,0x99,0xff, 0xdf,0x31,0x8f,0x48,0x3c,0x37}.

As illustrated in FIG. 2, the WiDi Sink may start a RTSP session over layer 3 of the infrastructure network using port supplied by WiDi Source within 3 seconds.

A WiDi Sink Discovery Response may include the following:

GUID:

{0x60,0x1e,0xf4,0x9a,0x03,0xee,0x4b,0x65,0xa1,0x3f, 0x8c,0x76,0xd3,0xf0,0xe8,0x10}

Length (2 Bytes): number of bytes (in network byte order) following this field that were sent.

Version number of Infrastructure Protocol. 1 Byte with value 0x01.

Capabilities (2 Bytes): In Network Byte Order.

0x00: Disable Real-Time Transport Protocol (RTP) Reordering (N/A for receive/RX).

0X01: Enable RTP Reordering (N/A for RX).

In illustrated processing block 307, the receiver receives streaming content from the client device via the infrastructure network link.

Figure 4A:
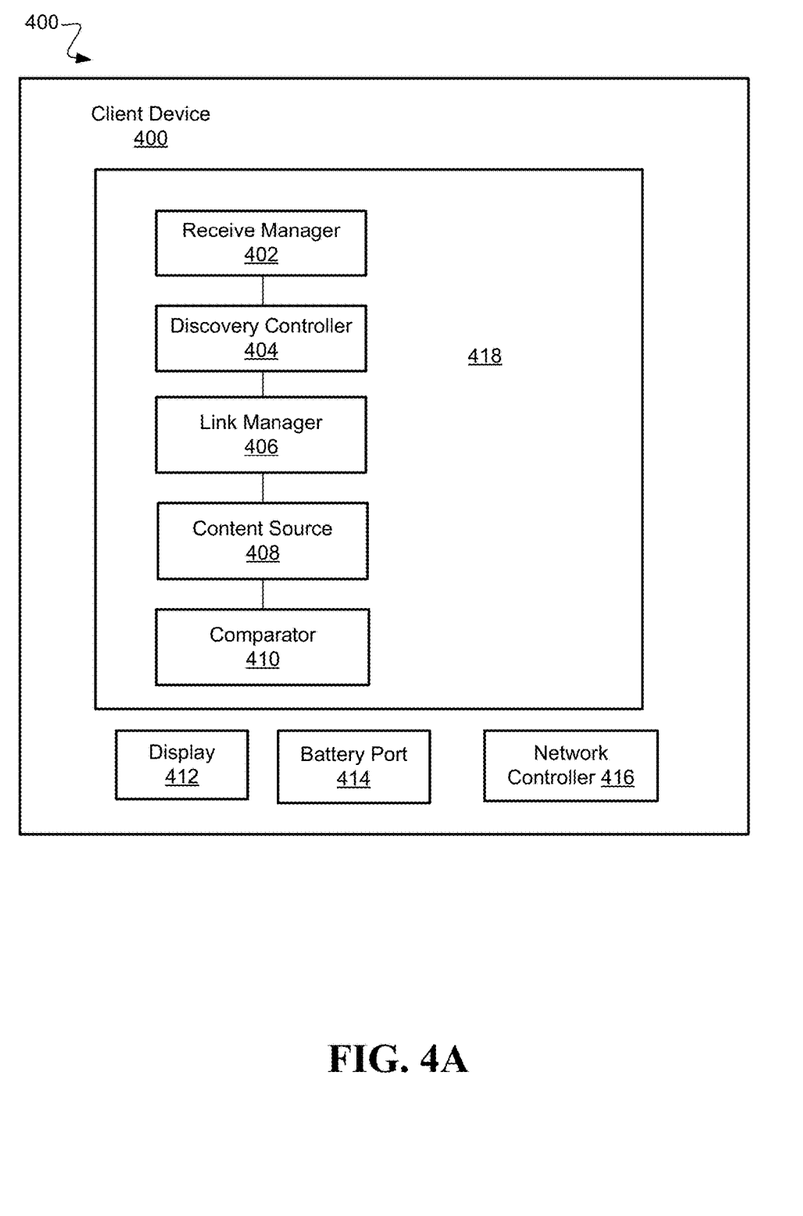
FIG. 4A is a block diagram of an example of a client device according to an embodiment.

FIG. 4A shows a client device/apparatus 400 according to an embodiment. The apparatus 400, which may be readily substituted for the client device 104 (FIG. 1), may generally implement one or more aspects of the method 300 (FIG. 3A), already discussed. In the illustrated example, the apparatus 400 includes a receive manager 402 that receives, via a WiFi link, information associated with an infrastructure discovery of a receiver. The apparatus 400 may also include a discovery controller 404 communicatively coupled to the receive manager 402, wherein the discovery controller 404 discovers a receiver via an infrastructure network link. The apparatus 400 may also include a link manager 406 communicatively coupled to the discovery controller 404, wherein the link manager 406 forms a connection with the receiver via the infrastructure network link. The apparatus 400 may also include a content source 408 communicatively coupled to the link manager 406, wherein the content source 408 streams content to the receiver via the connection. The apparatus may also include a comparator 410 communicatively coupled to the content source 408, wherein the comparator 410 may select the receiver from a plurality of receivers based on a strength of signal emitted by each receiver in the plurality of the receivers. The streamed content may be visually presented on, for example, a display 412. The apparatus 400 may also include a battery port 414 to obtain power for the device 400 and a network controller 416 to facilitate communications between the apparatus 400 and other devices (not shown). The apparatus 400 may include logic instructions, configurable logic, fixed-functionality logic hardware, etc., or any combination thereof. In one example, a semiconductor die 418 may include the receive manager 402, the discovery controller 404, the link manager 406, the content source 408 and the comparator 410 as a system on chip (SoC). The semiconductor die 418 may include, for example, a substrate (e.g., silicon, sapphire, gallium arsenide) and logic (e.g., transistor array and other integrated circuit/IC components) coupled to the substrate. The semiconductor die 418 may also include a graphics processing unit (GPU), graphics accelerator, graphics engine or other suitable processor.

Figure 4B:
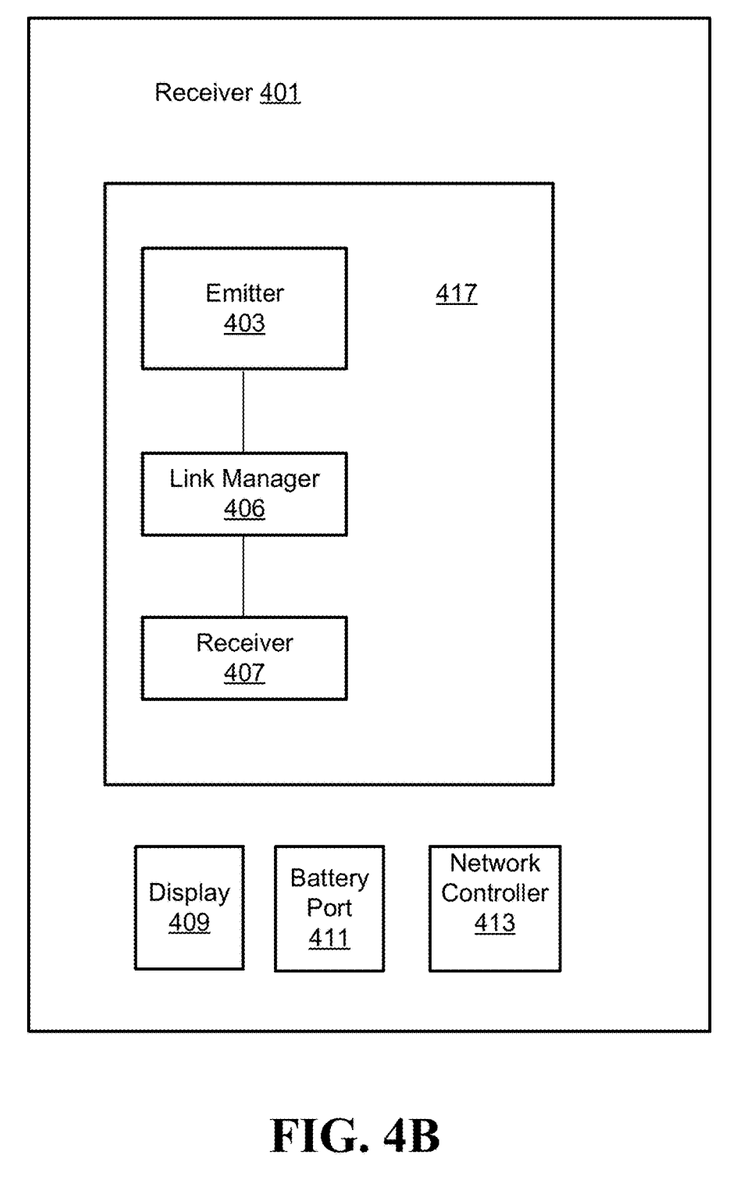
FIG. 4B is a block diagram of an example of a receiver according to an embodiment.

FIG. 4B shows a receiver apparatus 401 according to an embodiment. The apparatus 401, which may be readily substituted for the receiver 106 (FIG. 1), may generally implement one or more aspects of the method 301 (FIG. 3B), already discussed. In the illustrated example, the apparatus 401 includes an emitter 403 that emits a beacon signal via a WiFi link. The apparatus 401 may also include a link manager 404 communicatively coupled to the emitter 403, wherein the link manager 406 forms a connection with the client device 104 via an infrastructure network link. The apparatus 401 may also include a receiver 407 communicatively coupled to the link manager 406, wherein the receiver 407 receives streamed content from the client device 104 via the infrastructure network link. The streamed content may be visually presented on, for example, a display 409. The apparatus 401 may also include a battery port 411 to obtain power for the device and a network controller 413 to facilitate communications between the apparatus 401 and other devices (not shown). The apparatus 401 may include logic instructions, configurable logic, fixed-functionality logic hardware, etc., or any combination thereof. In one example, a semiconductor die 417 may include the emitter 403, the link manager 406 and the receiver 407 as a system on chip (SoC). The semiconductor die 417 may include, for example, a substrate and logic coupled to the substrate. The semiconductor die 417 may also include a GPU, graphics accelerator, graphics engine or other suitable processor.

Figure 5:
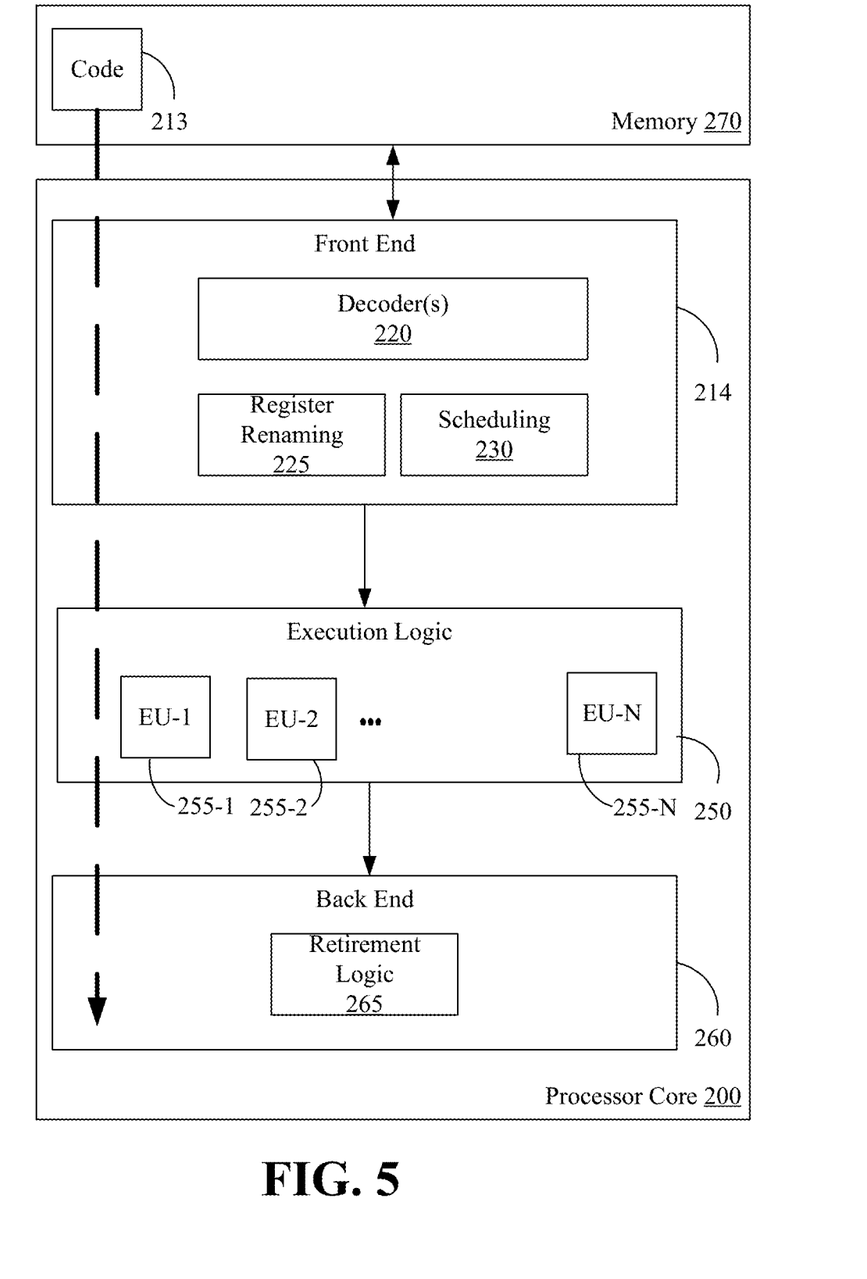
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 300 (FIG. 3A) and/or the method 301 (FIG. 3B), already discussed. The processor core 200 follows a program sequence of instructions indicated by the code 213. Each instruction may enter a front end portion 214 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 214 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
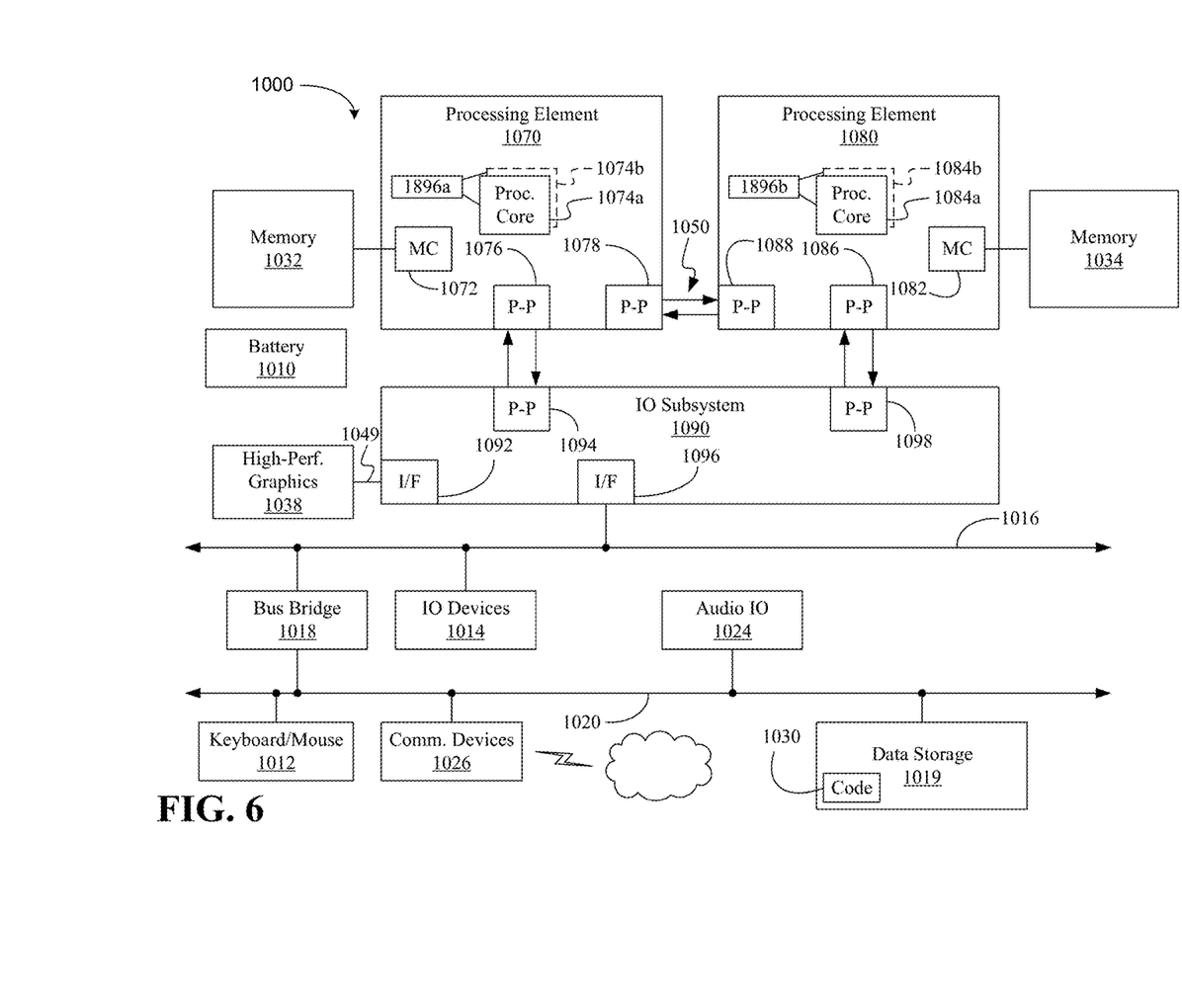
FIG. 6 is a block diagram of an example of a system according to an embodiment.

Referring now to FIG. 6, shown is a block diagram of a system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 4, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 300 (FIG. 3A) and/or the method 301 (FIG. 3B), already discussed, and may be similar to the code 213 (FIG. 5), already discussed. The system 1000 may also include an apparatus for operating client device such as, for example, the apparatus 400 (FIG. 4A) and an apparatus for operating a receiver such as, for example, the apparatus 401 (FIG. 4B). Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6. Moreover, the network controllers/communication device(s) 1026 may be implemented as a HFI (host fabric interface), also known as NIC (network interface card), that is integrated with one or more of the processing elements 1070, 1080 either on the same die, or in the same package.

Additional Notes and Examples

Example 1 may include a client apparatus to dock over infrastructure networks, comprising a receive manager to receive, via a WiFi link, information associated with an infrastructure discovery of a receiver, a discovery controller communicatively coupled to the receive manager, the discovery controller to discover a receiver via an infrastructure network link, a link manager communicatively coupled to the discovery controller, the link manager to form a connection with the receiver via the infrastructure network link, and a content source communicatively coupled to the link manager, the content source to stream content to the receiver via the connection.

Example 2 may include the client apparatus of Example 1, wherein the receive manager is to listen for a specially formatted server set identifier (SSID) that the receiver emits, and receive connection information from the receiver, wherein the connection information includes an encoded string that identifies an IP address and port number for connectivity to the receiver.

Example 3 may include the client apparatus of Example 2, further includes a comparator to select the receiver from a plurality of receivers based on a strength of signal emitted by each receiver in the plurality of the receivers.

Example 4 may include the client apparatus of Example 2, wherein the receipt of the information associated with the infrastructure discovery of the receiver is to be performed at layer 2 of the WiFi link.

Example 5 may include the client apparatus of Example 1, wherein the link manager is to send a discovery request to identify the receiver, receive a discovery response that identifies a connection request port, connect to the receiver via the connection request port, and establish a real time streaming protocol (RTSP) connection between with the receiver.

Example 6 may include the client apparatus of any one of Examples 1-5, wherein the discovery and the connection with the receiver are to be formed at layer 3 of the infrastructure network.

Example 7 may include at least one non-transitory computer readable storage medium comprising a set of instructions which, if executed by a computing device, cause the computing device to receive, via a WiFi link, information associated with an infrastructure discovery of a receiver, use the information to discover the receiver via an infrastructure network link, form a connection with the receiver via the infrastructure network link, and stream content to the receiver via the connection.

Example 8 may include the at least one non-transitory computer readable storage medium of Example 7, wherein the instructions if executed, further cause the computing device to listen for a specially formatted server set identifier (SSID) that the receiver emits, receive connection information from the receiver, wherein the connection information includes an encoded string that identifies an IP address and port number for connectivity to the receiver.

Example 9 may include at least one non-transitory computer readable storage medium of Example 8, wherein the instructions if executed, further cause the computing device to select the receiver from a plurality of receivers based on a strength of signal emitted by each receiver in the plurality of the receivers.

Example 10 may include at least one non-transitory computer readable storage medium of Example 8, wherein the instructions if executed, further cause the computing device to receive the information associated with the infrastructure discovery of the receiver at layer 2 of the WiFi link.

Example 11 may include at least one non-transitory computer readable storage medium of Example 7, wherein the instructions if executed, further cause the computing device to send a discovery request to identify the receiver, receive a discovery response that identifies a connection request port, connect to the receiver via the connection request port, establish a real time streaming protocol (RTSP) connection between with the receiver.

Example 12 may include the at least one non-transitory computer readable storage medium of any of Examples 7-11, wherein the instructions if executed, further cause the computing device to discover and form the connection with the receiver at layer 3 of the infrastructure network.

Example 13 may include a receiver apparatus, comprising an emitter to emit a beacon signal via a WiFi link, a link manager communicatively coupled to the emitter, the link manager to form a connection with a client device via an infrastructure network link, and a receiver communicatively coupled to the link manger, the receiver to receive streamed content from the client device via the infrastructure network link.

Example 14 may include the receiver apparatus of Example 13, wherein the emitter is to transmit an encoded string that identifies an Internet Protocol address and port identifier for connectivity to the receiver.

Example 15 may include the receiver apparatus of Example 13, wherein the emitter is to emit the beacon signal at layer 2 of the WiFi link.

Example 16 may include the receiver apparatus of Example 13, wherein the link manager is to send a discovery response to the client device that includes a port identifier and start a real time streaming protocol (RTSP) connection with the client device via the infrastructure network link.

Example 17 may include the receiver apparatus of Example 16, wherein the discovery response is to further include a version identifier of an infrastructure protocol, a device identifier and available connection information.

Example 18 may include the receiver apparatus of any one of Examples 13-17, wherein the connection is to be formed at layer 3 of the infrastructure network.

Example 19 may include at least one non-transitory computer readable storage medium comprising a set of instructions which, if executed by a computing device, cause the computing device to emit a beacon signal via a WiFi link, form a connection with a client device via an infrastructure network link, and receive streamed content from the client device via the infrastructure network link.

Example 20 may include the at least one non-transitory computer readable storage medium of Example 19, wherein the instructions, if executed, further cause the computing device to transmit an encoded string that identifies an Internet Protocol address and port identifier for connectivity to the receiver.

Example 21 may include The at least one non-transitory computer readable storage medium of Example 19, wherein the beacon signal is to be emitted at layer 2 of the WiFi link.

Example 22 may include the at least one non-transitory computer readable storage medium of Example 19, wherein the instructions, if executed, further cause the computing device to send a discovery response that includes a port identifier, and start a real time streaming protocol (RTSP) connection via the infrastructure network link.

Example 23 may include the at least one non-transitory computer readable storage medium of Example 22, wherein the discovery response is to further include a version identifier of an infrastructure protocol, a device identifier and available connection information.

Example 24 may include the at least one non-transitory computer readable storage medium of any of Examples 19-23, wherein the connection is to be formed at layer 3 of the infrastructure network.

Example 25 may include a method of operating a client apparatus to dock over infrastructure networks comprising receiving, via a WiFi link, information associated with an infrastructure discovery of a receiver, using the information to discover the receiver via an infrastructure network link, forming a connection with the receiver via the infrastructure network link, and streaming content to the receiver via the connection.

Example 26 may include the method of Example 25, wherein receiving the information includes listening for a specially formatted server set identifier (SSID) that the receiver emits, and receiving connection information from the receiver, wherein the connection information includes an encoded string that identifies an IP address and port number for connectivity to the receiver.

Example 27 may include the method of Example 26, further including selecting the receiver from a plurality of receivers based on a strength of signal emitted by each receiver in the plurality of the receivers.

Example 28 may include the method of Example 26, wherein the receipt of the information associated with the infrastructure discovery of the receiver is performed at layer 2 of the WiFi link.

Example 29 may include the method of Example 25, wherein forming the connection with the receiver includes sending a discovery request to identify the receiver, receiving a discovery response that identifies a connection request port, connecting to the receiver via the connection request port, and establishing a real time streaming protocol (RTSP) connection between with the receiver.

Example 30 may include the method of any one of Example 25-29, wherein the discovery and the connection with the receiver are formed at layer 3 of the infrastructure network.

Example 31 may include a client apparatus for docking over infrastructure networks, comprising means for receiving, via a WiFi link, information associated with an infrastructure discovery of a receiver, means for using information to discover the receiver via an infrastructure network link, means for forming a connection with the receiver via the infrastructure network link, and means for streaming content to the receiver via the connection.

Example 32 may include the client apparatus of Example 31, wherein the means for receiving the information includes means for listening for a specially formatted server set identifier (SSID) that the receiver emits, and means for receiving connection information from the receiver, wherein the connection information includes an encoded string that identifies an IP address and port number for connectivity to the receiver.

Example 33 may include the client apparatus of Example 32, further including means for selecting the receiver from a plurality of receivers based on a strength of signal emitted by each receiver in the plurality of the receivers.

Example 34 may include the client apparatus of Example 32, wherein the receipt of the information associated with the infrastructure discovery of receiver is to be performed at layer 2 of the WiFi link.

Example 35 may include the client apparatus of Example 31, wherein the wherein the means for forming the connection with the receiver includes means for sending a discovery request to identify the receiver, means for receiving a discovery response that identifies a connection request port, means for connecting to the receiver via the connection request port, and means for establishing a real time streaming protocol (RTSP) connection between with the receiver.

Example 36 may include the client apparatus of any one of Examples 31-35, wherein the discovery and the connection with the receiver to be formed at layer 3 of the infrastructure network.

Example 37 may include a method of operating a receiver apparatus, comprising emitting a beacon signal via a WiFi link, forming a connection with a client device via an infrastructure network link, and receiving streamed content from the client device via the infrastructure network link.

Example 38 may include the method of Example 37, wherein emitting the beacon signal includes transmitting an encoded string that identifies an Internet Protocol address and port identifier for connectivity to the receiver.

Example 39 may include the method of Example 37, wherein the beacon signal is to be emitted at layer 2 of the WiFi link.

Example 40 may include the method of Example 37, wherein forming the connection with the client device includes sending a discovery response that includes a port identifier, starting a real time streaming protocol (RTSP) connection via the infrastructure network link.

Example 41 may include the method of Example 40, wherein the discovery response further includes a version identifier of an infrastructure protocol, a device identifier and available connection information.

Example 42 may include the method of any one of Examples 37-41, wherein the connection is to be formed at layer 3 of the infrastructure network.

Example 43 may include a receiver apparatus, comprising means for emitting a beacon signal via a WiFi link, means for forming a connection with a client device via an infrastructure network link, and means for receiving streamed content from the client device via the infrastructure network link.

Example 44 may include the receiver apparatus of Example 43, wherein the means for emitting the beacon signal includes transmitting an encoded string that identifies an Internet Protocol address and port identifier for connectivity to the receiver.

Example 45 may include the receiver apparatus of Example 43, wherein the beacon signal is to be emitted at layer 2 of the WiFi link.

Example 46 may include the receiver apparatus of Example 43, wherein the means for forming the connection with the client device includes means for sending a discovery response that includes a port identifier, means for starting a real time streaming protocol (RTSP) connection via the infrastructure network link.

Example 47 may include the receiver apparatus of Example 46, wherein the discovery response further includes a version identifier of an infrastructure protocol, a device identifier and available connection information.

Example 48 may include the receiver apparatus of any one of Examples 43-47, wherein the connection is to be formed at layer 3 of the infrastructure network.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A client apparatus comprising:
a receive manager to listen for and receive, via a WiFi link, information associated with an infrastructure discovery of a receiver, wherein the information is received from the receiver in a beacon signal and includes a specially formatted server set identifier (SSID), and wherein the receive manager is to extract connection information from the SSID including an encoded string that identifies an Internet Protocol (IP) address and port number for connectivity to the receiver;
a discovery controller communicatively coupled to the receive manager, the discovery controller to discover the receiver via an infrastructure network link;
a link manager communicatively coupled to the discovery controller, the link manager to form a connection with the receiver via the infrastructure network link; and
a content source communicatively coupled to the link manager, the content source to stream content to the receiver via the connection.

2. The apparatus of claim 1, further includes a comparator to select the receiver from a plurality of receivers based on a strength of signal emitted by each receiver in the plurality of the receivers.

3. The apparatus of claim 1, wherein the receipt of the information associated with the infrastructure discovery of the receiver is to be performed at layer 2 of the WiFi link.

4. The apparatus of claim 1, wherein the link manager is to send a discovery request to identify the receiver, receive a discovery response that identifies a connection request port, connect to the receiver via the connection request port, and establish a real time streaming protocol (RTSP) connection between with the receiver.

5. The apparatus of claim 1, wherein the discovery and the connection with the receiver are to be formed at layer 3 of the infrastructure network.

6. At least one non-transitory computer readable storage medium comprising a set of instructions which, if executed by a computing device, cause the computing device to:
listen for and receive, via a WiFi link, information associated with an infrastructure discovery of a receiver, wherein the information is received from the receiver in a beacon signal and includes a specially formatted server set identifier (SSID), and wherein the receive manager is to extract connection information from the SSID including an encoded string that identifies an Internet Protocol (IP) address and port number for connectivity to the receiver;
use the information to discover the receiver via an infrastructure network link;
form a connection with the receiver via the infrastructure network link; and
stream content to the receiver via the connection.

7. The at least one non-transitory computer readable storage medium of claim 6, wherein the instructions if executed, further cause the computing device to select the receiver from a plurality of receivers based on a strength of signal emitted by each receiver in the plurality of the receivers.

8. The at least one non-transitory computer readable storage medium of claim 6, wherein the instructions if executed, further cause the computing device to receive the information associated with the infrastructure discovery of the receiver at layer 2 of the WiFi link.

9. The at least one non-transitory computer readable storage medium of claim 6, wherein the instructions if executed, further cause the computing device to:
send a discovery request to identify the receiver;
receive a discovery response that identifies a connection request port;
connect to the receiver via the connection request port;
establish a real time streaming protocol (RTSP) connection between with the receiver.

10. The at least one non-transitory computer readable storage medium of claim 6, wherein the instructions if executed, further cause the computing device to discover and form the connection at layer 3 of the infrastructure network.

11. A receiver apparatus comprising:
an emitter to emit a beacon signal via a WiFi link, wherein the beacon signal includes a specially formatted server set identifier (SSID) having an encoded string that identifies an Internet Protocol (IP) address and a port number for connectivity to a client device;
a link manager communicatively coupled to the emitter, the link manager to form a connection with the client device via an infrastructure network link; and
a receiver communicatively coupled to the link manger, the receiver to receive streamed content from the client device via the infrastructure network link.

12. The apparatus of claim 11, wherein the emitter is to emit the beacon signal at layer 2 of the WiFi link.

13. The apparatus of claim 11, wherein the link manager is to send a discovery response to the client device that includes a port identifier and start a real time streaming protocol (RTSP) connection with the client device via the infrastructure network link.

14. The apparatus of claim 13, wherein the discovery response is to further include a version identifier of an infrastructure protocol, a device identifier and available connection information.

15. The apparatus of claim 11, wherein the connection is to be formed at layer 3 of the infrastructure network.

16. At least one non-transitory computer readable storage medium comprising a set of instructions which, if executed by a computing device, cause the computing device to:
emit a beacon signal via a WiFi link, wherein the beacon signal includes a specially formatted server set identifier (SSID) having an encoded string that identifies an Internet Protocol (IP) address and a port number for connectivity to a client device;
form a connection with a client device via an infrastructure network link; and
receive streamed content from the client device via the infrastructure network link.

17. The at least one non-transitory computer readable storage medium of claim 16, wherein the beacon signal is to be emitted at layer 2 of the WiFi link.

18. The at least one non-transitory computer readable storage medium of claim 16, wherein the instructions, if executed, further cause the computing device to:
send a discovery response that includes a port identifier; and
start a real time streaming protocol (RTSP) connection via the infrastructure network link.

19. The at least one non-transitory computer readable storage medium of claim 18, wherein the discovery response is to further include a version identifier of an infrastructure protocol, a device identifier and available connection information.

20. The at least one non-transitory computer readable storage medium of claim 16, wherein the connection is to be formed at layer 3 of the infrastructure network.

* * * * *